W. L. PAUL.

SULKY PLOW.

APPLICATION FILED NOV 2, 1909.

Reissued May 10, 1910.

13,112.

4 SHEETS—SHEET 1.

WITNESSES

E. J. Nottingham

G. F. Downing

INVENTOR

W. L. Paul

By H. A. Seymour

Attorney

W. L. PAUL.

SULKY PLOW.

APPLICATION FILED NOV. 2, 1909.

Reissued May 10, 1910.

13,112.

4 SHEETS—SHEET 2.

WITNESSES

E. J. Nottingham

G. F. Downing

INVENTOR

W. L. Paul

By H. A. Seymour

Attorney

W. L. PAUL.

SULKY PLOW.

APPLICATION FILED NOV. 2, 1909.

Reissued May 10, 1910.

13,112.

4 SHEETS—SHEET 3.

WITNESSES

E. J. Nottingham

G. F. Downing

INVENTOR

W. L. Paul

By H. A. Seymour

Attorney

W. L. PAUL.

SULKY PLOW.

APPLICATION FILED NOV. 2, 1909.

Reissued May 10, 1910.

13,112.

4 SHEETS—SHEET 4.

WITNESSES

E. L. Nottingham

G. F. Downing.

INVENTOR

W. L. Paul

By H. A. Seymour Attorney

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

SULKY-PLOW.

13,112. Specification of Reissued Letters Patent. Reissued May 10, 1910.

Original No. 925,593, dated June 22, 1909, Serial No. 458,231. Application for reissue filed November 2, 1909. Serial No. 525,969.

*To all whom it may concern:*

Be it known that I, WILLIAM L. PAUL, of South Bend, in the county of St. Joseph and State of Indiana, have invented certain new and useful Improvements in Sulky-Plows; and I do hereby declare the following to be a full, clear, and exact description of the invention, such as will enable others skilled in the art to which it appertains to make and use the same.

This invention relates to improvements in sulky-plows, and more particularly to means for raising the plows, one object of the invention being to provide simple and efficient appliances to facilitate the raising of the plows either manually or by power applied by the draft animals, and to provide devices whereby the power lifting means can be thrown into action by the operator either with his hand or with his foot.

With these objects in view the invention consists in various novel features of construction and combinations of parts as hereinafter set forth and pointed out in the claims.

Figure 1:
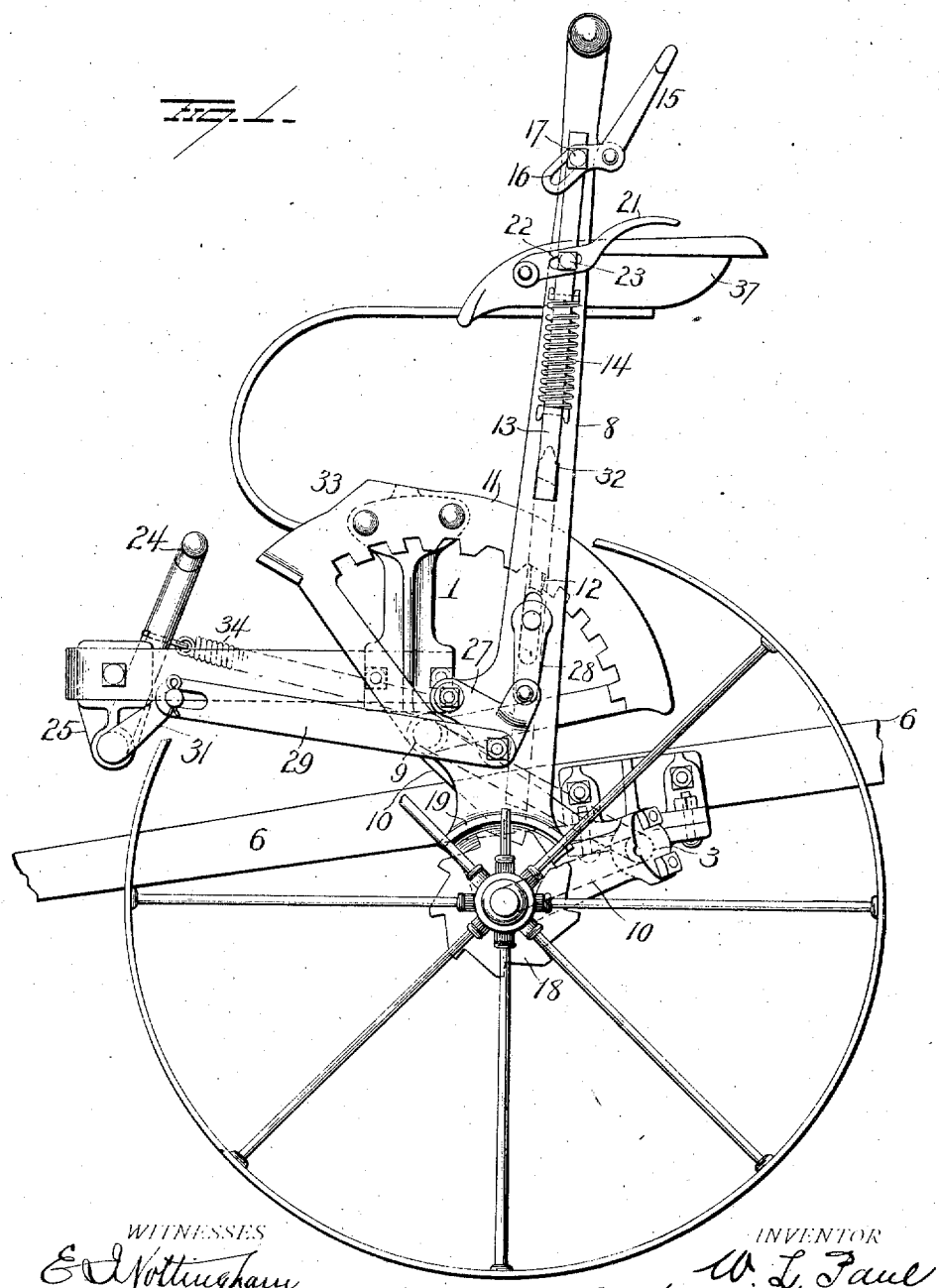
Figure 2:
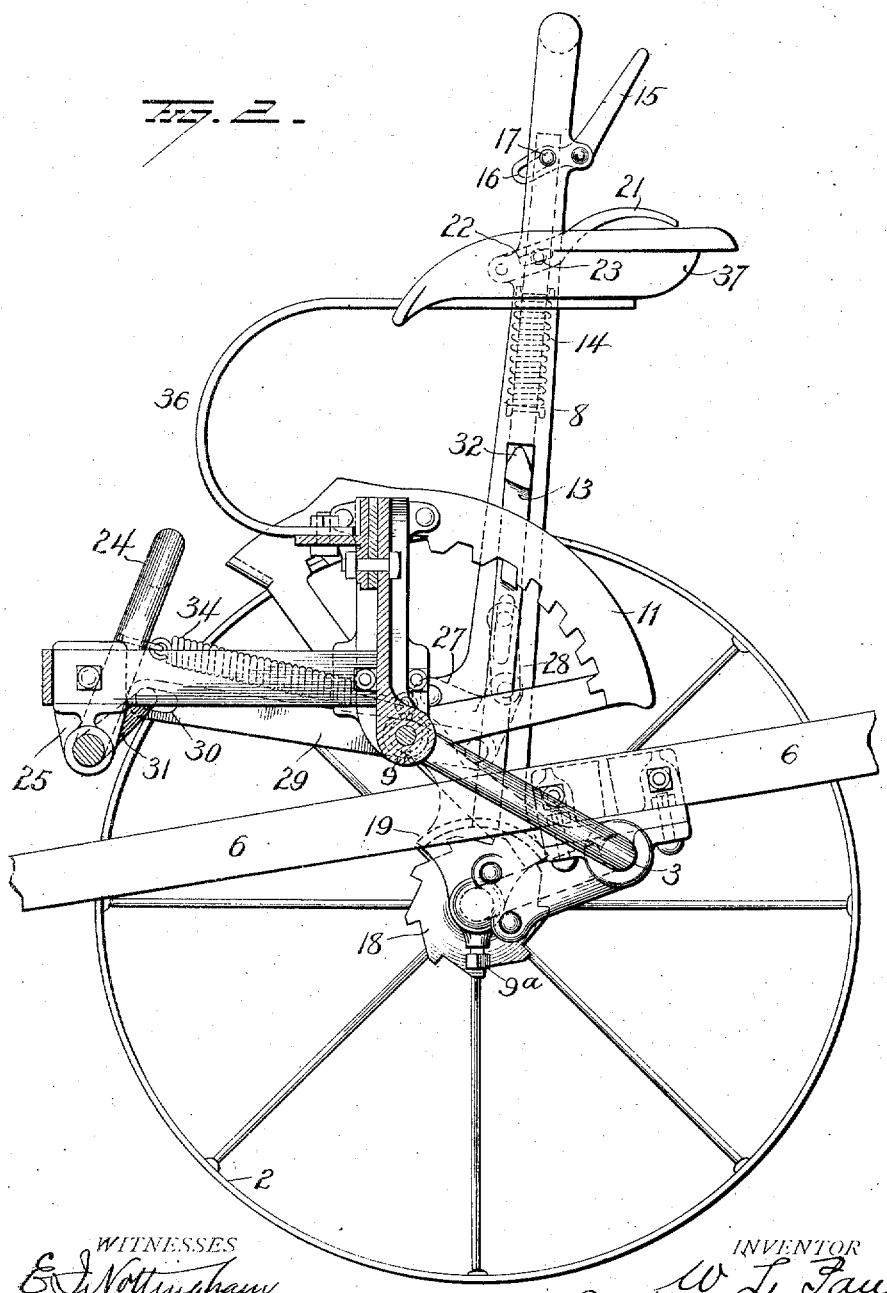
Figure 3:
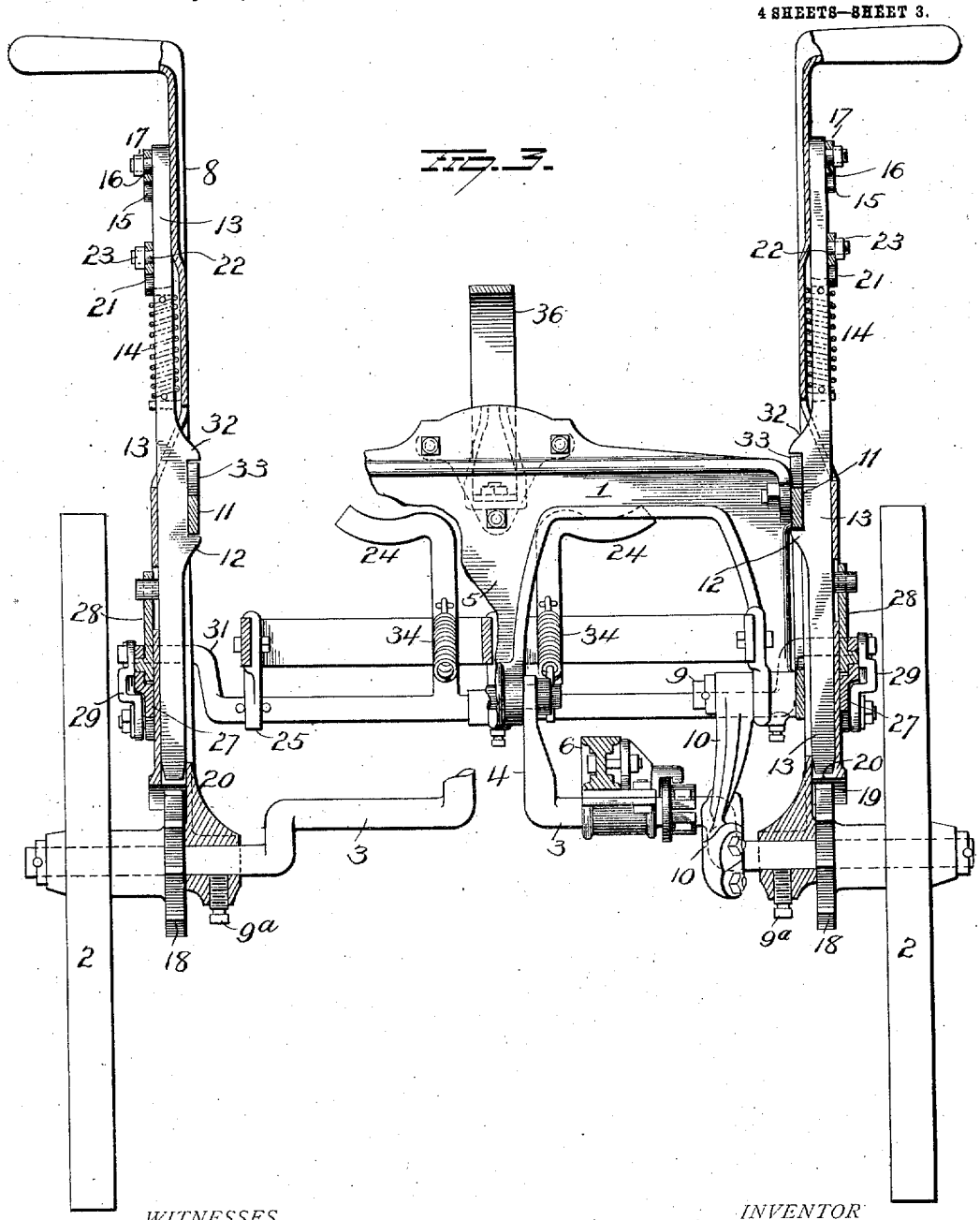
Figure 4:
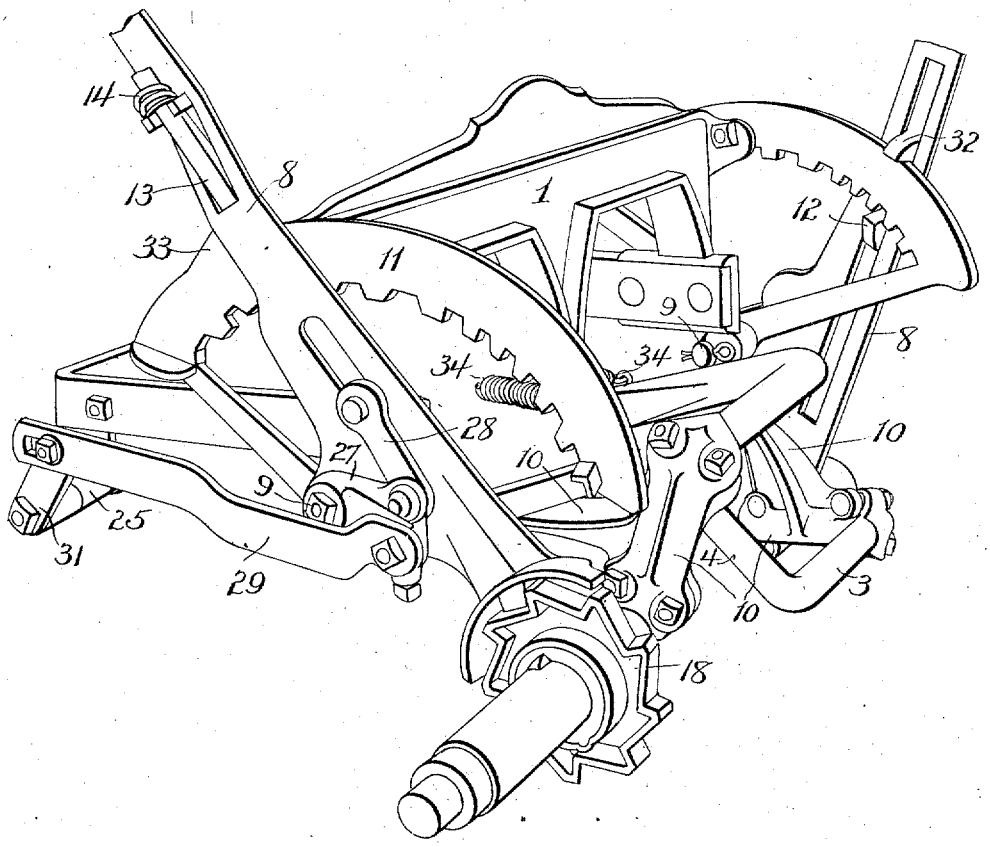

In the accompanying drawings, Figure 1 is a side elevation of a plow showing my improvements. Fig. 2 is a sectional view, Fig. 3 is an end view partly in section, and Fig. 4 is a perspective view illustrating my improvements.

1 represents the frame of a sulky plow and 2 the carrying wheels. The axle of the machine comprises two bails 3, 3, each provided at its outer end with a journal for the accommodation of a carrying wheel. Each bail 3 is provided at its inner end with an arm 4 and the arms 4 of the respective bails are pivotally connected with a depending portion 5 located centrally between the sides of the frame 1. Plow beams 6 are mounted between their ends upon the respective bail-axle-sections and provided at their rear ends with plow bottoms in the usual manner.

At each side of the frame 1, an operating lever 8 is located and pivotally supported at 9 by depending portions of the frame. The lower end of each operating lever is connected with one of the axle bails and secured by a set screw $9^a$, preferably in proximity to the journals on which the carrying wheel is mounted, as clearly shown in Fig. 3. It is apparent that when one of these levers is moved by the operator, the bail with which the lever is connected will be turned and the plow connected with this bail will be raised or lowered. In order to insure the proper operation of the axle bails without danger of binding or straining the pivotal supports, an arm 10 is rigidly secured at one end to each bail and at the other end pivotally connected with the frame approximately in horizontal alinement with the pivotal support of the operating levers and the inner ends of the bails.

Segments 11 are mounted on the frame 1 at respective sides thereof and each of these segments is provided on its under side or edge with teeth to be engaged by a lug 12 on a locking bar 13 carried by the operating lever. This locking bar is normally pressed upwardly to insure the engagement of the lug 12 with the teeth of the segment 11 by means of a spring 14. When the plow is to be raised by hand the locking bar will be moved downwardly so as to disengage the lug 12 from the tooth segment 11 and this can be readily accomplished by means of a latch-lever 15 pivotally attached to the operating lever and provided at one side of its pivotal support with an elongated slot 16 to receive a pin 17 projecting from the locking-bar. It is apparent that by pressing the latch-lever toward the operating lever, the locking bar will be slid downwardly against the resistance of the spring 14 and the lug 12 will be disengaged from the toothed segment.

Each carrying wheel has secured to its hub a ratchet or clutch wheel 18 and each operating lever is provided with a curved flange or hood 19 overhanging the clutch wheel. Each curved flange or hood 19 is provided with an opening 20 for the passage of the lower end of the locking bar 13 so that the latter can be moved downwardly to engage the clutch or ratchet wheel. This downward movement of the locking-bar may be accomplished by means of a latch lever 21 pivoted to the operating lever preferably at a point below the latch lever 15 and provided with a slot 22 to receive a pin 23 on the locking bar. When the locking bar has been thus moved downwardly so as to engage the clutch or ratchet wheel, the forward movement of the draft animals and the consequent turning of the carrying wheel will cause motion to be transmitted through the ratchet or clutch wheel, the locking-bar and the operating lever, to the axle bail with which the operating lever is connected and the turning of this bail will effect the raising of the plow.

It may at times be inconvenient or undesirable for the operator to have his attention detracted from the draft animals when he desires to effect the raising of one or the other plow, and hence I have provided means whereby the devices which effect the raising of the plows can be controlled through the medium of foot levers. These devices will now be described. Two foot levers 24, 24, are mounted in suitable brackets 25 depending from the forward portion of the frame 1 at the sides of the latter and in a bracket 26 located intermediate the sides of the frame. A bell-crank lever 27 is pivotally attached to each operating lever 8 at a point in proximity to the pivotal support of the latter. One arm of this bell-crank lever is connected by means of a link 28 with the locking-bar 13 carried by the operating lever. To the other arm of the bell-crank lever 27, one end of a rod or link 29 is pivotally attached and the other end of said rod or link is provided with an elongated slot 30 to receive the end of a crank arm 31 on the adjacent foot lever 24. By reason of the play afforded by the slot 30, the operator can move the locking bar by hand without also moving the foot lever.

From the construction and arrangement of parts above described it will be seen that when the operator moves a foot lever 24 forwardly, the rod or link 29 will also be moved forwardly and motion will be transmitted through the bell-crank lever 27 and the link 28 to the locking-bar so as to cause the latter to descend and engage the ratchet or clutch wheel on the adjacent carrying wheel. The forward motion of the machine will now cause the operating lever to be turned and the axle bail with which it is connected to be also turned and the plow to be raised. As the operating lever moves forwardly, a lug 32 on the locking bar 13 will engage a cam or shoulder 33 on the top of the segment 11 when the plow shall have been sufficiently raised, and thus cause the locking-bar to be elevated out of engagement with the ratchet or clutch wheel, when the carrying wheel to which this clutch wheel is secured can run freely. The locking bar 13 will now be caused, by the action of the spring 14, to engage a tooth of the segment 11. The foot levers are maintained in their normal position by means of springs 34 attached at one end to said levers and at the other end to the frame 1. The spring standard 36 for a seat 37 is attached to the frame of the machine.

Having fully described my invention what I claim as new and desire to secure by Letters-Patent, is:—

1. In a sulky plow, the combination with a plow beam, a hand lever, a clutch wheel and a segment, of a single mechanism mounted on the hand lever and adapted to be simultaneously engaged with and disengaged from the clutch wheel and segment respectively, a foot lever independently and fixedly mounted with respect to the hand lever, and means connecting said foot lever with said single mechanism on the hand lever for actuating said mechanism.

2. In a sulky plow, the combination with a plow beam, a hand lever operatively connected with said beam, a segment, and a clutch wheel rotatable with a wheel of the plow, of locking means carried by said hand lever and adapted to coöperate with both the segment and the clutch wheel, and a foot lever connected with said locking means on the hand lever and operable to simultaneously disengage said locking means from the segment and move the same into engagement with the clutch wheel, said foot lever mounted on a non-adjustable part of the frame.

3. In a sulky plow, the combination with a plow beam, a raising lever, and a clutch wheel connected with a wheel of the plow, of engaging means for the clutch wheel carried by the raising lever, a toothed segment with which the engaging means coöperates, a foot lever mounted on a non-adjustable part of the structure, and connections between the foot lever and engaging means for unlocking the latter from the segment and moving it into engagement with the clutch.

4. In a sulky plow, the combination with a bail, a plow beam and an operating lever connected with the bail for raising the plow, of a locking-bar, a segment to coöperate with said locking bar, a clutch wheel to be engaged by the locking bar, a foot lever and devices intermediate the foot lever and the locking bar for moving the same into engagement with the clutch wheel.

5. In a sulky plow, the combination with a bail, a carrying wheel, a plow beam connected with the bail, and an operating lever also connected with the bail, of a clutch wheel carried by the carrying wheel, a locking-bar carried by the operating lever to engage said clutch wheel, a toothed segment, means for normally holding the locking bar out of engagement with the clutch wheel and in engagement with the toothed segment, a foot lever and devices intermediate of the foot lever and the locking bar for moving the latter out of engagement with the toothed segment and into engagement with the clutch wheel.

6. In a sulky-plow, the combination with a fixed frame, a bail, a carrying wheel, a plow-beam attached to the bail, a clutch wheel secured to the carrying wheel and an operating lever mounted on the frame of the machine and connected with the bail, of a locking bar carried by the operating lever, a toothed segment to be engaged by said locking-bar, hand operated devices mounted on the lever and connected with the locking bar and a foot operated device mounted on the fixed frame, and connections between the foot operating device and the locking-bar for moving the same out of engagement with the toothed segment and into engagement with the clutch wheel.

7. In a sulky plow, the combination with a frame, a bail, a plow beam, and an operating lever, of a locking bar, a segment to operate with said locking bar, a clutch wheel to be engaged by the locking bar, a foot lever mounted on the frame, a slotted bar connected with foot lever, and connections between said slotted bar and locking bar.

8. In a sulky plow, the combination with a frame, a bail, a plow beam and an operating lever, of a locking device, a segment to coöperate with said locking device, a clutch wheel to be engaged by the locking device, a foot lever mounted on the frame, a bar connected with the foot lever, and connections between said bar and locking device.

9. In a sulky plow, the combination with a frame, a bail, a plow beam, and an operating lever, of a locking bar carried by the operating lever, a segment to coöperate with said locking bar, a clutch wheel to be engaged by the locking bar, a foot lever mounted on the frame, a bell-crank mounted on the operating lever, means connecting one arm of said bell-crank with the foot lever, and a link connecting the other arm of said bell-crank with the locking bar.

10. In a sulky plow, the combination with a fixed frame, a bail, a plow beam and an operating lever, of a locking device carried by the operating lever, a segment to coöperate with said locking device, a clutch wheel to be engaged by the locking device, a foot lever mounted on the fixed frame, a bell-crank mounted on the operating lever, means connecting one arm of the bell crank with the foot lever, and means connecting the other arm of the bell-crank with the locking device.

In testimony whereof, I have signed this specification in the presence of two subscribing witnesses.

WILLIAM L. PAUL.

Witnesses:

CLYDE C. McDONALD,

DONALD A. HIMES.